United States Patent [19]

Sträter

[11] Patent Number: 4,682,749
[45] Date of Patent: Jul. 28, 1987

[54] ADJUSTABLE COPYHOLDER WITH ARTICULATED ARMS

[76] Inventor: Fritz Sträter, Unterm Bamberg 1, D-5882 Meinerzhagen, Fed. Rep. of Germany

[21] Appl. No.: 807,452

[22] Filed: Dec. 10, 1985

[30] Foreign Application Priority Data

Oct. 28, 1985 [EP] European Pat. Off. ........ 85113678.8

[51] Int. Cl.⁴ ............................................. E04G 3/00
[52] U.S. Cl. .................................. 248/284; 248/592; 248/454; 188/339; 188/166; 33/430
[58] Field of Search ...................... 248/447, 441.1, 449, 248/454, 457, 585, 586, 587, 592, 284; 188/78, 336, 338, 339, 166, 167; 33/430, 500

[56] References Cited

U.S. PATENT DOCUMENTS

| | | | |
|---|---|---|---|
| 794,099 | 7/1905 | Heaney | 248/454 |
| 1,460,697 | 7/1923 | Bendlin | 248/276 |
| 2,046,806 | 7/1936 | Baum et al. | 188/78 |
| 2,134,512 | 10/1938 | Hall | 188/78 |
| 3,160,379 | 12/1964 | Gardella | 248/592 |
| 4,533,027 | 8/1985 | Otani et al. | 188/166 |

FOREIGN PATENT DOCUMENTS

| | | | |
|---|---|---|---|
| 108192 | 10/1967 | Denmark | 248/592 |
| 762310 | 1/1954 | Fed. Rep. of Germany | 188/336 |
| 89253 | 5/1921 | France | 248/447 |
| 613711 | 11/1926 | France | 188/78 |
| 1194091 | 11/1959 | France | 188/78 |
| 1361516 | 4/1964 | France | 188/339 |

Primary Examiner—Cornelius J. Husar
Assistant Examiner—Anthony Knight
Attorney, Agent, or Firm—Karl F. Ross; Herbert Dubno; Ronald Lianides

[57] ABSTRACT

An adjustable copyholder comprises a base and a cantilever arm having a plurality of cantilever arm segments attached thereto, and a copy support plate mounted at the free end of the cantilever arm. The cantilever arm is connected pivotally to the base. The cantilever arm segments are connected pivotally with each other. The copy support plate is connected pivotally to the cantilever arm. The pivot joints used to extend the cantilever arm have single pivot axes which are parallel to each other, horizontal and transverse to the cantilever arm, wherein these pivot joints are manually adjustable, at least controllable frictionally, the pivotability of the cantilever arm segments connected pivotally with each other being associated with a securing mechanism for each pivot joint. In order to provide for a simple more reliable operation at least one handle is provided, which is constructed and arranged to act by means of intermediate members on the plurality of securing mechanisms associated with the pivot joints having a single pivot axis.

18 Claims, 6 Drawing Figures

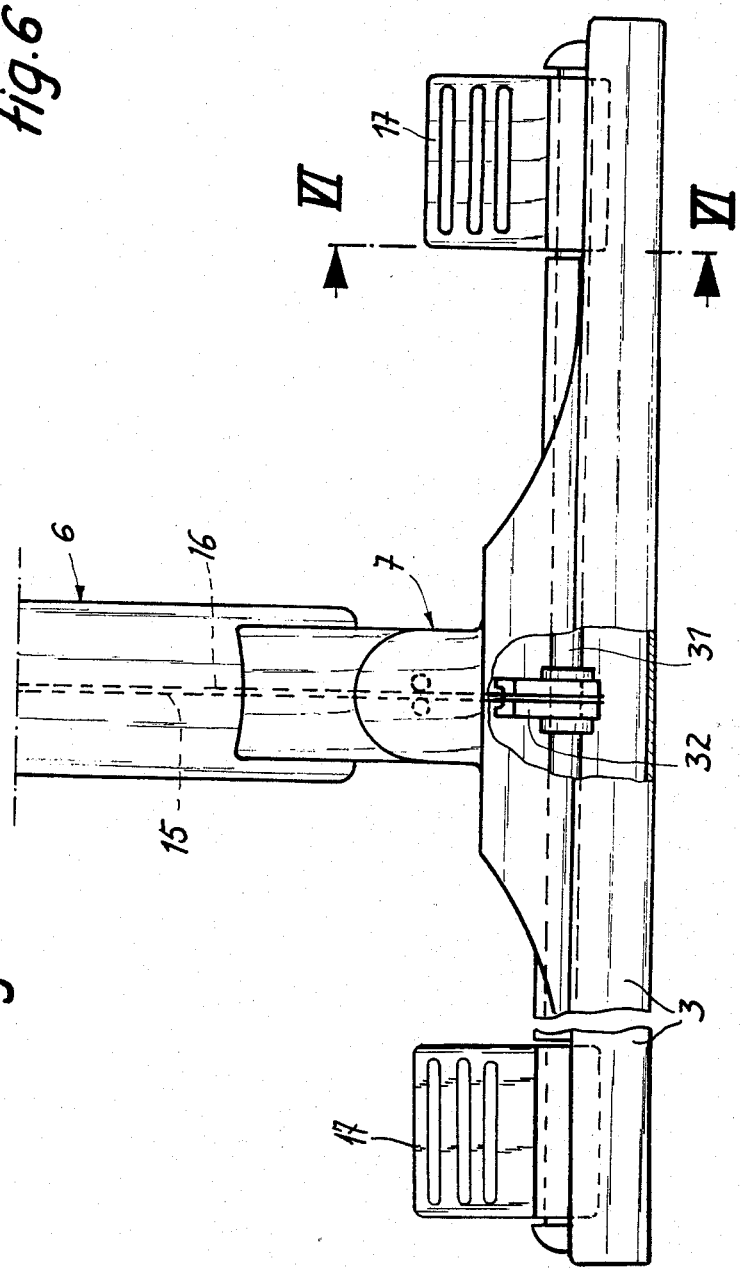

ADJUSTABLE COPYHOLDER WITH ARTICULATED ARMS

FIELD OF THE INVENTION

My present invention relates to an apparatus or device for holding flat copy and and, more particularly, to a manually adjustable copyholder for holding copy including sheets of paper, cardboard, pictures and drawings for writing, drafting, artwork and display.

BACKGROUND OF THE INVENTION

A copyholder can comprise a base, a plurality of mutually articulated arms cantilevered to the base, a copy support plate or thelike mounted at the free end of the cantilevered arm.

The cantilevered arm is usually pivotable about the base, the cantilevered arm segments being pivotable with respect to each other, while the copy support plate is pivotable on the cantilevered arm.

The pivotability can be controlled by a plurality of manually adjustable pivot joints which are at least frictionally controlled by a securing mechanism associated with each pivot joint. At least one handle, which acts on a plurality of securing mechanisms associated with the pivot joints by way of at least one intermediate member can be positioned at least adjacent the copy support plate. The intermediate members and the securing mechanisms can be arranged inside of the cantilevered arm segments, and a tension or traction line (cable, cord or rope) which crosses the central pivot axes is provided as at least one of the intermediate members.

This kind of copyholder is described in U.S. Pat. No. 1,460,697 and allows for a sketch, paper or the like to be brought into a position beneficial to the user in a particular working environment. Thus the base can be constructed as a heavy stand for example. Also instead of a stand on the base a clamping holder for attachment of the copyholder, for example, to a table edge, may be provided, whereby the base can be supported to pivot about a vertical axis.

The cantilevered articulated arm comprises at least two cantilevered arm segments positioned one after another in succession, These arm segments adjust the height of the copyholder by pivoting the cantilevered arm segment individually, and the distance the cantilevered arm is extended, i.e. the range of the copyholder.

Moreover it may be necessary to change the position of the cantilevered arm by disengaging the securing mechanisms associated with the pivot joints by loosening of the handle and therefore the traction line. The copy support plate may then be brought into the desired position and subsequently the securing mechanisms may be relocked.

In prior art copyholders individual segments of the traction line found between the frictionally or otherwise controlled securing mechanisms are under tension or stretched to attain a pivot-blocking force and friction whose magnitude is determined by the tension, so that a substantial force must be applied to the handle in order to secure the pivot joints.

It is also known in the prior art to associate each pivot joint with an additional manually operable clamping mechanism.

OBJECTS OF THE INVENTION

Based on this state of the art it is an essential object of my invention to provide a copyholder in which a release and securing of the pivot joints is accomplished with higher reliability and reduced applied force.

It is a general object of my invention to provide an improved adjustable copyholder obviating drawbacks of earlier copyholders.

It is also an object of my invention to provide an adjustable copyholder which is more reliably adjusted, or secured in or released from a particular configuration, than those of the prior art.

It is another object of my invention to provide an adjustable copyholder, which requires less application of force to secure or release from a particular position than those of the prior art.

SUMMARY OF THE INVENTION

These objects and others which will become more apparent hereinafter are attained in an adjustable copyholder for writing, drafting, display, or the like work comprising a base, a cantilevered articulated arm having a plurality of mutually articulated cantilevered arm segments attached to the base and a copy support plate mounted at the free end of the cantilevered arm.

The cantilevered arm is pivotable about an axis on the base, the cantilevered arm segments are pivotable about each other, and the copy support plate is pivotable on the cantilevered arm, and the pivotability of the cantilevered arm segments and the copy support plate is controlled by a plurality of manually adjustable, at least frictionally effective pivot joints each having a securing mechanism associated therewith.

At least one handle, which acts by means of at least one intermediate member on a plurality of the securing mechanisms, is mounted at least in the vicinity of the copy support plate. The intermediate members and the securing mechanisms are positioned inside of the cantilevered arm segments, and a traction line, which crosses a central pivot axis of at least one pivot joint, is provided as one of the intermediate members.

According to my invention the pivot joints for extension of the articulated cantilevered arm have pivot axes running parallel to each other, substantially horizontally, and transverse to the cantilevered arm. The securing mechanisms each have at least one internal expanding arc segmented brake shoe positioned coaxially to the pivot axes. In each of the pivot joints at the ends of the respective arm segments, a pivot joint passage is oriented coaxially to the pivot axis in a first part of the pivot joint, at least one nearly circular, enclosed brake shoe is mounted so as to be spreadable against the tension of an arc segmented brake shoe spring.

More specifically this brake shoe is formed as an interrupted ring with a gap between its opposing ends. This brake shoe cooperates with a spreading member operable indirectly by means of a handle held in another second part of the pivot joint and engaged between the opposing ends of the brake shoe and contacting the surfaces of the pivot joint passage at least under frictional control.

This spreading member is mounted to pivot about a rotation axis parallel to the pivot joint axis, which is positioned between the opposing ends of the brake shoe facing each other. Furthermore the spreading member has an oval shape, wherein the small diameter of the spreading member is equal to the distance between the arc-segmental brake shoe ends facing each other in the released arc-segmental brake shoe, while the large diameter of the spreading member is greater than the distance between the opposing ends of the arc-segmental brake shoe under tension contacting the radially exterior sides of the pivot joint passage.

A turning lever extends from the spreading member, on which a spring member for pivoting it into a locked or secured position and a traction line assigned to release the arc-segmental brake shoe connected to at least one of the handles act. All traction lines formed as intermediate members are operable by a common handle.

It is thus possible to release and lock all the securing mechanisms with a single handle, but with application of only a force required to overcome that of the spring members acting on the spreading members. Moreover in the released position each arc-segmental brake shoe is released from the radially exterior sides or surfaces of the pivot joint passage rotatable therein, and bears by its own intrinsic inward force on the relatively nonrotatable pivot joint passage surfaces, which the handle force reduces.

By the first part of a pivot joint is meant a part of a cantilevered arm segment or base which extends into the pivot joint to partially form it, and by the second part of the pivot joint is meant the part of the component of the copyholder to be joined by the pivot joint to the above-mentioned cantilevered arm segment or base.

Of course the first part of the pivot joint necessarily rotates relative to the second part.

According to the invention, by roughening, milling, or providing gear teeth on the sides or surfaces of the pivot joint passage and the contacting surfaces of the arc-segmental brake shoe, a contact in which the arc-segmental brake shoe fits into the passage interior sides (form-fit) is attained, so that an undesired positional shift overcoming a frictional force is prevented.

According to a feature of my invention the spring member comprises a coil spring with an initial compression (precompression). This coil spring is supported between the turning levers of the spreading members and a support attached to the second part of the pivot joint.

In another feature of my invention the coil spring is slipped on or mounted on a twin segmented guide rod comprising two individual guide rod segments, the two individual guide rod segments being in telescoping engagement with each other. The free end of a first individual guide rod segment is connected pivotally with the turning levers of the spreading member, and a second individual guide rod segment is connected pivotally with the support on the second part of the pivot joint.

One end of the coil spring is braced on the first guide rod segment and the other end of the coil spring is braced on the second guide rod segment.

According to yet another feature of my invention, the free end of the first guide rod segment has a joint groove therein extending transverse to the longitudinal direction of the guide rod, in which a pivot pin oriented in the same direction as the joint groove, and associated with the turning levers engages, so that the pivot pin is rotatable about its longitudinal axis and the rotational axis of the spreading member.

The free end of the second guide rod segment can have a ball end and in the support a spherically shaped seat is positioned, so as to cooperate with the ball end.

The pivot joints are so structured that the operational reliability and useful life of the apparatus is improved. The first part of the pivot joint is provided with two parallel lateral surfaces facing away from each other, in each of which a circular groove coaxial to the axis of the pivot joint is provided, in which one of the brake flanges is inserted.

In the first part of the pivot joint passage coaxial to the circular grooves and smaller in diameter than the circular grooves is provided.

Moreover, the second part of the pivot joint is assembled from two substantially channel shaped bars, so as to have a boxlike cross section, these channel shaped bars having pivot members extending transversely therefrom, which engage rotatably in the pivot joint passage of the first part of the pivot joint. Each of the arc-segmental brake shoes can be associated with one of the aforesaid spreading members, and the turning levers directed in the same direction with respect to each other can be connected with each other transversely by the pivot pin, and a common spring and traction line on the pivot pin of the spreading members of each of the pivot joints.

In each of the pivot members of each of the cantilevered arm segments a central recess can be provided, in which a central joint bolt is mounted.

The one of the pivot joints connecting the cantilevered arm and the copy support plate is preferably constructed as a universal joint, and moreover this universal joint is provided with its own adjusting and holding device, preferably in the form of a locking eccentric which is operable independently of the lock handle for the articulated arm.

The handle may be extended from a handle shaft rotatably mounted on the rear side of the copy support plate, this handle shaft being oriented substantially at right angles to the traction lines guided through the universal joint,and a handle is provided at both ends of the handle shaft.

According to yet another preferred embodiment of my invention, the cantilevered arm and each of the guide rods carrying the coil springs are so limited in pivotability that the cantilevered arm segments of the cantilevered arm and the guide rods carrying the coil spring form an angle which is always less than 180°.

BRIEF DESCRIPTION OF THE DRAWING

The above and other objects, features, and advantages of my invention will become more readily apparent from the following description, refreence being made to the accompanying drawing in which:

FIG. 5 is a plan view in the direction of the arrow V of FIG. 1; and

FIG. 6 is a sectional view taken along the section line VI—VI of FIG. 5.

SPECIFIC DESCRIPTION

Figure 1:
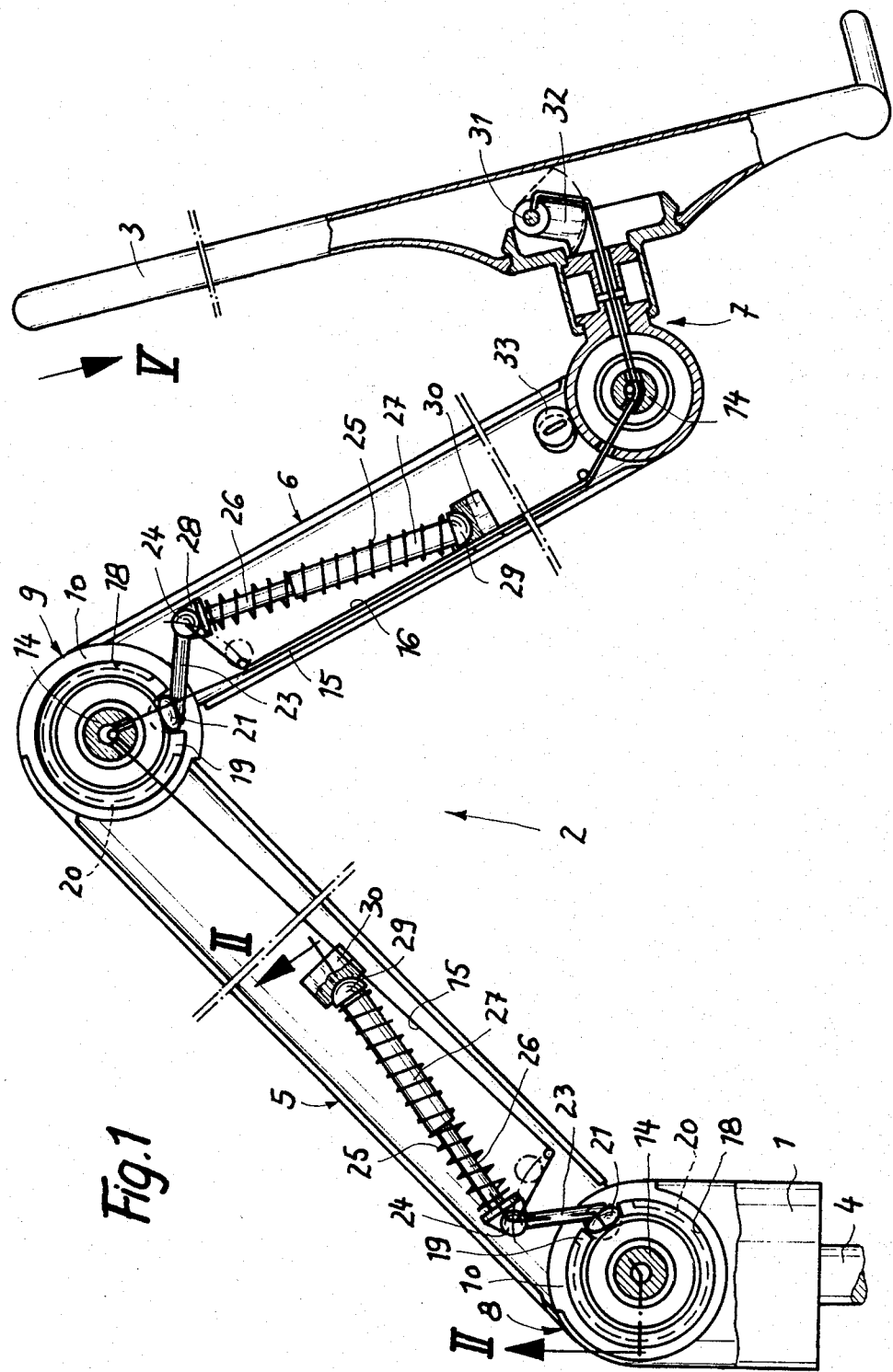
FIG. 1 is a schematic cross sectional view of a preferred embodiment of a copyholder according to my invention, shown largely broken away.
Figure 2:
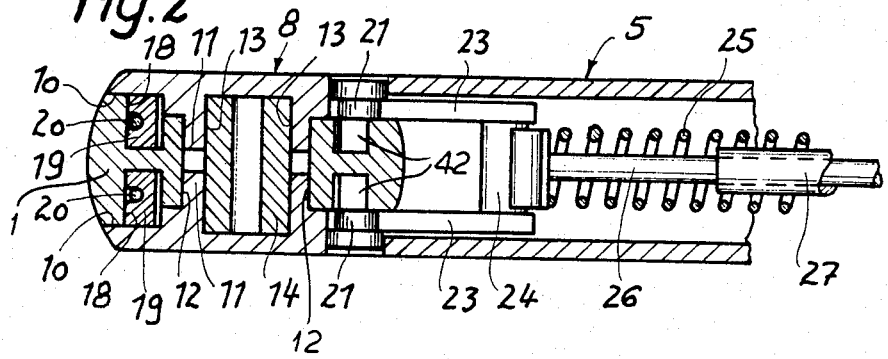
FIG. 2 is a cross sectional view taken along the section line II—II of FIG.1.

The copyholder shown in the drawing comprises a base 1, an articulated cantilever arm 2, and a copy support plate 3 attached to the free end of the cantilever arm 2.

The base 1 is held so as to be rotatable about a vertical axis on a stand 4 or in a clamping holder (not shown).

The base 1 can also be provided with a mechanism for mounting the copyholder on an upright wall.

The cantilever arm 2 pivotally connected to the base 1 comprises two oblong cantilever arm segments 5 and 6, which are pivotally connected with each other, and the copy support plate 3 is mounted on the free end (i.e. the end furthest removed from the one connected to the base) of the cantilever arm 2 by means of a universal or cardan joint 7, whose two pivot axes are at right angles to each other.

Both other joints, namely the pivot joint 8 connecting the cantilever arm segment 5 with the base 1 and the pivot joint 9 connecting both cantilever arm segments 5 and 6 with each other are constructed as single axis pivot joints with their axes of rotation horizontal and parallel to each other.

The cantilever arm segments 5 and 6 are assembled from two substantially channel shaped bars or shells, so that they have a customary boxlike profile. At the mounted end of the cantilever arm segment 5, planar surfaces 10 are formed on a circular joint portion of base 1 on two parallel sides facing away from each other, which are oriented perpendicularly to the pivot axes of arms 5 and 6. The interior surfaces of the prong shaped joint portion ends of the cantilever arm segment 5 and-/or 6 contact these planar surfaces 10.

From the inside of the above mentioned ends of the cantilever arm segment 5 circular pivot members 11 are extended toward the inside of pivot joint 8 and form a circular pivot joint passage 12 in the cantilever arm segment 5. In both pivot members 11 blind bores or cylindrical recesses 13 are provided, in which a center joint bolt 14 is fit or inserted.

The pivot joints 8 and 9 are each provided with a securing mechanism which by way of traction lines 15 and 16 can be operated by a handle or handles 17 positioned on the copy support plate 3. The securing mechanism is constructed as an expanding brake device of the kind such that in both surfaces 10 of base 1 a circular groove 18 of a larger diameter than and coaxial to the pivot joint passage 12 is provided.

In each of these circular grooves 18 a nearly circular, expandable arc-segmental brake shoe 19 is inserted. This arc-segmental brake shoe 19 is shaped like a ring which has been interrupted so that it has two opposing ends 41 and 42 with a gap therebetween.

Figure 4:
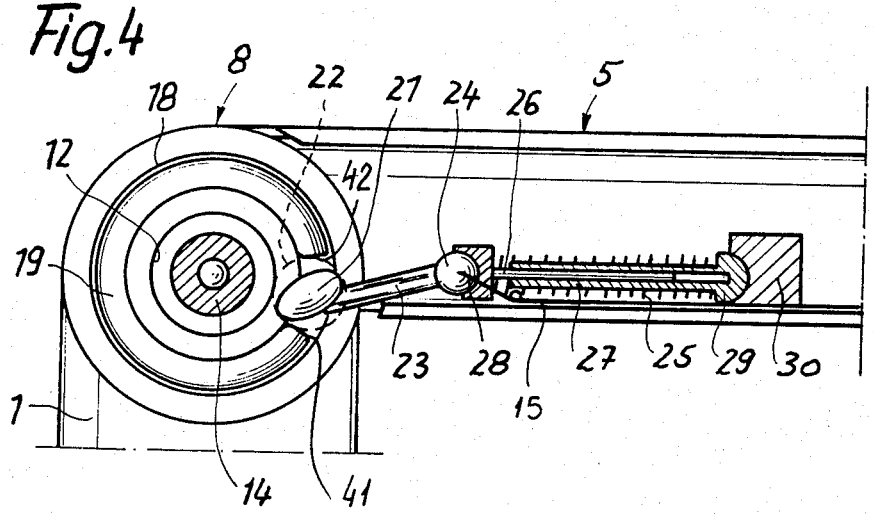
FIG. 4 is a view similar to FIG. 3 showing the pivot securing mechanism released.

Each arc-segmental brake shoe 19 has a spring ring mounted in a groove therein, which exerts a compressive force directed toward the center of either pivot joints 8 or 9 so that, as apparent from FIG. 4, when spring rings 20 are released the arc-segmental brake shoe 19 are positioned with clearance from the radially exterior sides of the circular grooves 18, whereas however the arc-segmental brake shoes 19 contact on the radially interior sides of the circular grooves 18(which are, of course, a part of the component of the pivot joint 8 which moves during an adjustment of the position of the copy holder).

A spreading member 21 is provided between the ends 41 and 42 of each arc-segmented brake shoe 19 at which point the width of the base is reduced positioned with spacing from each other. These spreading members 21 are mounted inside the cantilever arm segments 5 and-/or 6, and supported in them so as to pivot about rotation axes parallel to the pivot joint pivot axes, in which the oval shaped spreading members 21 have adjacent cylindrical turning pins 22 shaped for guiding engagement in the arm segments.

Figure 3:
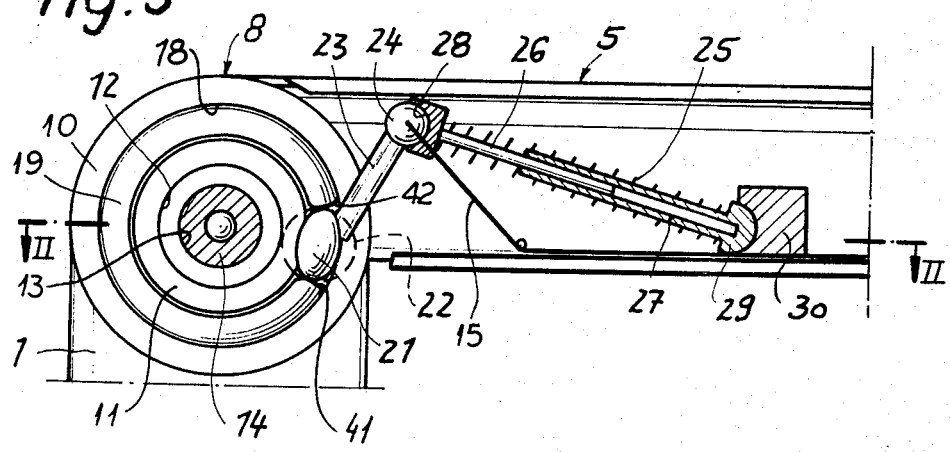
FIG. 3 is a diagrammatic detail view pratly broken away of a pivot securing mechanism of the apparatus of FIG. 1 inits secured or locked position.

As is apparent in FIGS. 3 and 4 the small diameter of each spreading member 21 is smaller than or just equal to the smallest distance between the ends 41 and 42 of each arc-segmental brake shoe 19 directed toward or facing each other, while the large diameter of the spreading member 21 is larger than the largest possible distance between the ends 41 and 42 of each arc-segmental brake shoe 19 facing each other, so that by rotation of the spreading members 21, the arc-segmental brake shoes 19 with their outside surfaces can contact at least frictionally the radially outer sides of the circular groove 18 and therefore lock the pivot joint 8 or 9.

Advantageously the juxtaposed surfaces which engage when the shoe expands are provided with gear teeth to engage with each other, or at least milled or roughened, in order to attain a close fit in the locked or secured position and therefore to provide a quasi-rigid union, and are out of engagement with each other in the released or loosened position.

Turning levers 23 extend from each spreading member 21, and turning levers 23 are undetachably connected pairwise by means of pivot pins 24 positioned parallel to the pivot axes of the spreading members 21. The spreading members 21 of each pivot joint 8 and 9 are pivotable under tension by means of coil springs 25 positioned inside of the cantilever arm segments 5 and-/or 6.

The coil compression springs 25 are slated on twin segmented guide rods whose individual guide rod segments 26 and 27 are in telescoping engagement with each other. At both ends of the guide rod on the individual guide rod segments 26 and 27 shoulders are provided on which the coil spring 25 is braced in a partially compressed or prestressed position.

Further on the free end of the individual guide rod segment 26 (i.e. the end defining the outer limit of the complete twin guide rod), a groove 28 is provided, in which the pivot pins 24 are rotatably engaged. The free end portion of the individual guide rod segments 27 (i.e. the end defining a second outer limit of the complete twin guide rod) is formed as a ball end 29, which is braced in a fixed support 30, which has a spherically shaped seat in which the ball end 29 fits.

On each pivot pin 24 an end of the traction line 15 and/or 16 is attached and the traction lines 15 and/or 16 are run in the vicinity of the pivot pins 24 in a direction away from them, so that by means of tension on the traction lines 15 and/or 16 the turning levers 23 and therefore the spreading member 21 can be pivoted in the position shown in FIG. 4, while in FIG. 3, the traction lines are relieved and the coil spring 25 causes an expansion of the expandable arc-segmental brake shoes 19 and therefore a frictional contact or engagement of gear teeth on the radially exterior sides of the circular grooves 18. The traction lines 15 and 16 pass through the pivot joints 7, and 9, so that the traction lines 15 and 16 cross the pivot joint central axes. There suitable traction line deflectors are provided at the central joint bolts 14. The handle 17 extended from the rear side of the copy support plate 3 is supported rotatably on the handle shaft 31, and is rigidly attached thereto. On the handle shaft 31 opposite to the universal joint 7 a disk segment 32 is rigidly mounted, on whose periphery the ends of the traction lines 15 and 16 are so attached, that the traction lines 15 and 16 can be wound up on the disk segment 32 by rotation of the handle shaft 31 by the handle 17.

In order to guarantee a satisfactory windup of the traction lines 15 and 16 on the disk segment 32, the traction lines 15 and 16 are aligned on at right angles to the handle shaft 31.

So that the traction lines 15 and 16 can be operated equally well by left or right handed people, the handle shaft 31 extends across the complete width of the copy support plate 3 and at both ends of the shaft 31 a handle 17 is mounted (See FIG. 5).

On the cantilever arm segment 6 a securing and clamping eccentric 33 acting on the universal joint 7 is provided. The arc-segmental brake shoe 19 can be coated exteriorly also with a friction coating.

In the securing mechanism associated with the joints 8 and/or 9 it is important that with the securing mechanisms starting from the secured or locked position the turning levers 23 and the individual guide rod segments 26 and 27 carrying the coil spring 25 cannot be allowed to pivot past the dead center point during release, so that the coil spring 25 cannot proceed further to swing the turning levers 23 into a locked position on the other side of dead center. As is apparent from FIG. 4, this constraint ensures that the turning levers 23 are limited in their pivotability, so that before reaching the dead center point, also before the turning levers 23 and the guide rod segments 26 and 27 form a straight line, they strike the wall of the cantilever arm segment 5 or 6.

I claim:

1. In an adjustable copyholder for writing, drafting and display, comprising a base, a cantilever arm having a plurality of cantilever arm segments and said arm attached to said base, a copy support plate mounted at a free end of said cantilever arm furthest removed from an end attached to said base, wherein said cantilever arm segments are pivotable about each other, and said copy support plate is pivotable on said cantilever arm, the pivotability of said cantilever arm segments and said copy support plate being controlled by a plurality of manually adjustable pivot joints each having a securing mechanism associated therewith, at least one handle which acts by means of at least one intermediate member on a plurality of said securing mechanisms, and is mounted at least in the vicinity of said copy support plate, wherein said intermediate members and said securing mechanisms are positioned inside of said cantilever arm segments, and at least one traction line, which crosses a central axis of one of said pivot joints and provided as one of said intermediate members, the improvement wherein said pivot joints of said cantilever arm have pivot axes which are substantially horizontal, and parallel to each other and at least one of said securing mechanisms has at least one arc-segmental brake shoe coaxial with a respective pivot axis, in each of said pivot joints at least one pivot joint passage oriented coaxially to said pivot axis is provided in a first part of one of said pivot joints for extension of said cantilever arm, in which at least one nearly circular, enclosed one of said arc-segmental brake shoes is mounted so as to be spreadable against the tension of an arc-segmental brake shoe spring, wherein said arc-segmental brake shoe is formed as an interrupted ring with a gap between the opposing ends of said arc-segmental brake shoe, said arc-segmental brake shoe by means of a spreading member held in a second part of said one of said pivot joints for extension of said cantilever arm, and engaged between opposing ends of said arc-segmental brake shoe, is united for locking engagement with said second part of said pivot joint, and contacts the surfaces of said pivot joint passage at least with frictional contact, said spreading member being mounted pivotable on a rotational axis parallel to said pivot axes, said rotational axis being positioned between said arc-segmental brake shoe ends facing each other, further said spreading member having an oval shape, wherein the small diameter of said spreading member is generally equal to the distance between said opposing ends of said arc-segmental brake shoe facing each other in said arc-segmental brake shoe when released, while the larger diameter of said spreading member is generally greater than the distance between said opposing ends of said arc-segmental brake shoe when said arc-segmental brake shoe under tension contacts the radially interior sides of said pivot joint passage, a spring member being provided for pivoting said spreading member into a locked position and said traction line being connected to release said arc-segmental brake shoe upon operation by said handle, and that all of said traction lines forming said intermediate members are operable by means of a common one of said handles.

2. The improvement according to claim 1 wherein said surfaces of said pivot joint passages and the surfaces of said arc-segmental brake shoe coming into engagement therewith are milled.

3. The improvement according to claim 1 wherein said spring member comprises a coil spring under precompression, said coil spring being braced on a turning lever of said spreading member and on a support connected to said second part of said pivot joint.

4. The improvement according to claim 3 wherein said coil spring is mounted on a twin segmented guide rod comprising two individual guide rod segments, said two individual guide rod segments being in telescoping engagement with each other, wherein the free end of a first one of said individual guide rod segments is connected jointedly with said turning lever of said spreading member, said free end defined by an outer limit of said twin segmented guide rod, and a second one of said individual guide rod segments is connected with said support on said second part of said pivot joint, and wherein one end of said coil spring is braced on said first guide rod segment and the other end of said coil spring is braced on said second guide rod segment.

5. The improvement according to claim 4 wherein said free end of said first guide rod segment has a joint groove therein extending transverse to the longitudinal direction of said guide rod, said joint groove engaging a pivot pin oriented in the same direction as said joint groove and said turning lever, so that said spreading member attached to said turning lever is rotatable about the rotational axis of said pivot pin.

6. The improvement according to claim 5 wherein a free end of said second guide rod segment, defined by a second outer limit of said twin segmented guide rod, has a ball end thereon and in said support a spherically shaped seat is positioned so as to cooperate with said ball end.

7. The improvement according to claim 6 wherein said first part of said pivot joint has two parallel lateral surfaces facing away from each other, in each of which a circular groove coaxial to said pivot axis is provided and forms a part of said pivot joint passage, in each circular groove of which one of said arc-segmental brake shoes is inserted, said second part of said pivot joint being assembled from two substantially channel shaped bars so as to have a boxlike cross section, said channel shaped bars having pivot members extending therefrom which engage rotatably in said pivot joint passage of said first part of said pivot joint, furthermore each of said arc-segmental brake shoes is associated with one of said spreading members, and wherein said turning levers directed in the same direction with respect to each other are connected with each other transversely by said pivot pin, and a common one of said spring members and a common one of said traction lines acts on said pivot pin of said spreading members of each of said pivot joints.

8. The improvement according to claim 7 wherein in each of said pivot members of each of said cantilever arm segments a cylindrical recess is provided, in which a central joint bolt is mounted.

9. The improvement according to claim 8 wherein said cantilever arm and each of said guide rods carrying said coil springs are limited in pivotability, whereby said cantilever arm segments of said cantilever arm and said guide rods carrying said coil spring form an angle which is always less than 180°.

10. The improvement according to claim 1 wherein the one of said pivot joints connecting said cantilever arm and said copy support plate is formed as a universal joint, and said universal joint is provided with an adjusting and holding device in the form of a rotatably mounted tensioning eccentric.

11. The improvement according to claim 1 wherein said handle extends from a handle shaft rotatably mounted on the rearside of said copy support plate, said handle shaft being oriented substantially at right angles to said traction lines guided through said universal joint, and said handle shaft has a disk segment mounted thereon on whose periphery said traction lines are mounted under tension.

12. The improvement according to claim 11 wherein said handle shaft extends substantially over the entire width of said copy support plate, said disk segment is positioned opposite said universal joint, and one of said handles is provided at both ends of said handle shaft.

13. In a copyholder for use in a writing, drafting, display, or the like workplace comprising a base, a cantilever arm having a plurality of cantilever arm segments pivotally connected to said base, a copy support plate attached pivotally to a free end furthest removed from an end of said arm connected to said base of said cantilever arm, wherein a plurality of manually adjustable pivot joints control the pivotability of said cantilever arm on said base, said copy support plate on said cantilever arm, and said cantilever arm segments with respect to each other, and are each provided with a securing mechanism, each of said pivot joints for extension of said cantilever arm having a first part rotatable with respect to a second part thereof, said copyholder further comprising at least one handle and at least one intermediate member connected to said handle and to at least one of said securing mechanisms for control thereof, wherein at least one traction line is provided as one of said intermediate members, the improvement wherein at least one of said securing mechanisms is formed as at least one nearly circular enclosed arc-segmental brake shoe formed as an interrupted ring with a gap between the opposing ends of said arc-segmental brake shoe, and mounted between said first and said second parts of one of said pivot joints for extension of said cantilever arm in a pivot joint passage in a circular groove thereof in said one of said pivot joints coaxial with said pivot axis, said arc-segmental brake shoe being dimensioned, so as to be spreadable against the tension of an arc-segmental brake shoe spring for frictional engagement with surfaces of said circular groove between said first and said second parts by means of a spreading member operable indirectly by said handle, said spreading member being mounted pivotally between said opposing ends of said arc-segmental brake shoe, and having an oval shape, wherein the small diameter of said spreading member is equal to the distance between said opposing ends of said arc-segmental brake shoe facing each other in said arc-segmental brake shoe when released, while the large diameter of said spreading member is greater than the distance between said opposing ends of said arc-segmental brake shoe when in a locked, secured position, and a turning lever extends from each of said spreading members, on which a spring member for pivoting said spreading member into said locked engaged position and a traction line assigned to release said arc-segmental brake shoe connected to said handle act at least indirectly, and said intermediate members are all operable by means of said handle.

14. A copyholder for flat sheets comprising a base rotatable about a vertical axis:
an articulated arm swingably mounted on said base at a first horizontal axis defined by a pivot joint, said arm having two segments connected pivotally together at another pivot joint having a second horizontal axis, each of said pivot joints comprising:
inner and outer parts coaxial with one another at the rspective axes and relatively rotatable,
an arc-segmental brake shoe disposed between said parts and formed as an interrupted ring having opposing ends,
a spreader between said opposite ends of said shoes and mounted on said inner part for rotation between positions in which said ends are spread apart to urge said brake shoes against said outer part and in which said ends approach each other when said brake shoes are released from engagement with said outer part; and
spring means for biasing said spreaders into said position wherein said ends are spread apart;
a copy support plate pivotally connected to said arm at an end thereof furthest removed from an end of said arm mounted on said base;
a handle on said plate; and
at least one traction element operatively connected to said handle and to said spreaders for rotating said spreaders against the force of said spring means to disengage said brake shoes from the respective outer parts.

15. The copyholder defined in claim 14 wherein said copy support plate is pivotally connected to said arm at a universal joint, further comprising an eccentric lock engageable with said universal joint for releasing and locking pivotal movement of said universal joint independently of operation of said brake shoes.

16. The copyholder defined in claim 15 wherein a pair of handles are pivotally mounted on said plate on opposite sides of said universal joint and are formed with a common shaft provided with means for exerting traction upon a pair of traction elements extending through said universal joint to the respective spreaders, the traction element running to the spreader of the pivot joint having said first axis passing through the center of said pivot joint having said second axis.

17. The copyholder defined in claim 16 wherein each of said spreaders is an oval member rotatable about an axis parallel to the axis of the respective pivot joint and having a radial arm, said traction elements being connected to said radial arms, each of said radial arms being formed with a pivot pin, each of said spring means including:

a pair of telescoping rods;

a ball end on one of said rods;

a socket fixed on respective arm segments receiving the ball end of said one of said rods;

a groove formed on the other of said rods receiving the pivot pin formed on the respective radial arm; and a compression coil spring braced under precompression between said groove on said other of said rods and said ball end on said one of said rods.

18. The copyholder defined in claim 17 further comprising means for preventing each of said radial arms and the respective pair of telescoping rods from swinging through a dead center position.

* * * * *